Jan. 19, 1954

A. EPPLER, JR 2,666,511

CLUTCH CONTROL MECHANISM

Filed Sept. 8, 1951

Inventor
Andrew Eppler Jr.
By his Attorney

Jan. 19, 1954   A. EPPLER, JR   2,666,511
CLUTCH CONTROL MECHANISM
Filed Sept. 8, 1951   2 Sheets-Sheet 2

Inventor
Andrew Eppler Jr.
By his Attorney

Patented Jan. 19, 1954

2,666,511

UNITED STATES PATENT OFFICE 2,666,511

CLUTCH CONTROL MECHANISM

Andrew Eppler, Jr., Lynn, Mass., assignor to United Shoe Machinery Corporation, Flemington, N. J., a corporation of New Jersey Application September 8, 1951, Serial No. 245,720

1 Claim. (Cl. 192—22)

This invention relates to clutch control mechanisms and it is herein disclosed as embodied in a mechanism for controlling a Horton clutch of the type illustrated in United States Letters Patent No. 2,158,192, granted May 16, 1939 upon the application of Vernon H. Meyer. Although the mechanism herein disclosed is shown as operable upon a Horton clutch, it is equally suitable for use with rolling pin clutches or with sliding pin clutches and, in general, it can be applied to any self-engaging rotary clutch having a driven member which carries means for disengaging the clutch. The control mechanism disclosed in the above-mentioned patent to Meyer comprises a treadle which operates a member engageable with the disengaging means on the driven member of the clutch to cause the clutch to disengage, and if the operator desires to engage the clutch for only a single revolution he must promptly release the treadle or the clutch will remain engaged and the cycle of operations will be repeated until he does release the treadle. A number of such control mechanisms now in operation require the attention of the operator in promptly releasing the treadle whenever the machine is to be stopped at the end of a single revolution.

It is an object of the present invention to provide a simple modification whereby existing clutch control mechanisms of the type disclosed in said Letters Patent 2,158,192 can, by relatively slight changes, be made non-repeating. This is accomplished in the illustrated mechanism by providing in the treadle mechanism a connection which is released by a cam on the driven clutch member to render the treadle inoperative before the driven clutch member has completed a revolution.

Referring now to the drawings,

Fig. 3 is a side elevation of a portion of the mechanism immediately after engagement of the clutch;

Fig. 4 is a view similar to Fig. 3 showing the mechanism in readiness to cause disengagement of the clutch;

Figure 2:
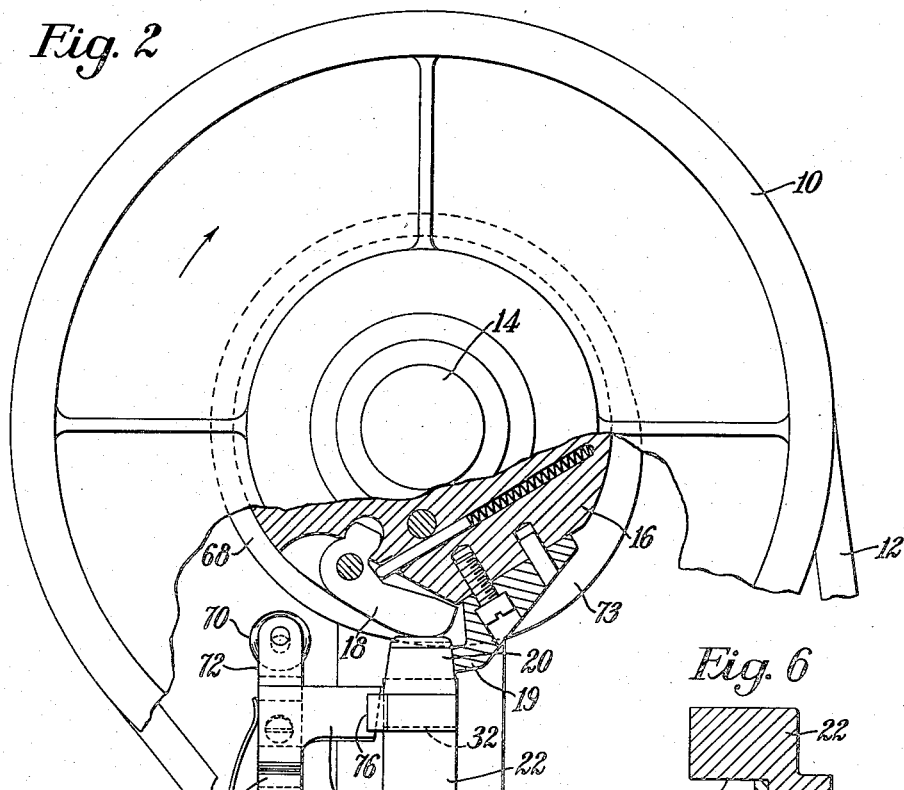
Fig. 2 is an end elevation of the parts shown in Fig. 1.

The illustrated control mechanism is shown herein as applied to a Horton clutch like that disclosed in Letters Patent No. 2,158,192 above mentioned. The driving member of this clutch comprises a pulley 10 driven by a belt 12 and loosely mounted upon a shaft 14. A driven member 16 of the clutch is fixed upon the shaft 14 and carries a disengaging arm 18 and an abutment 19 (Figs. 2 and 3) which correspond to the members 40 and 90, respectively, of the clutch disclosed in said Letters Patent.

In accordance with the present invention the clutch is normally held disengaged by a lug 20 engaging the arm 18 and extending up from an upstanding arm 22 of a holding lever in the form of a bell crank fulcrumed upon a pin 24 carried by a stationary frame portion 26 of the machine. The above-mentioned bell crank has a forwardly extending arm 28 which is urged up by a compression spring 30 housed in an upright bore in the frame member 26. A lug 32 extending laterally from the upright arm 22 of the bell crank is yieldingly held by the spring 30 against a shoulder 34 (Figs. 3 and 4) formed on the frame portion 26 to maintain the lug 20 in clutch disengaging position.

Figure 1:
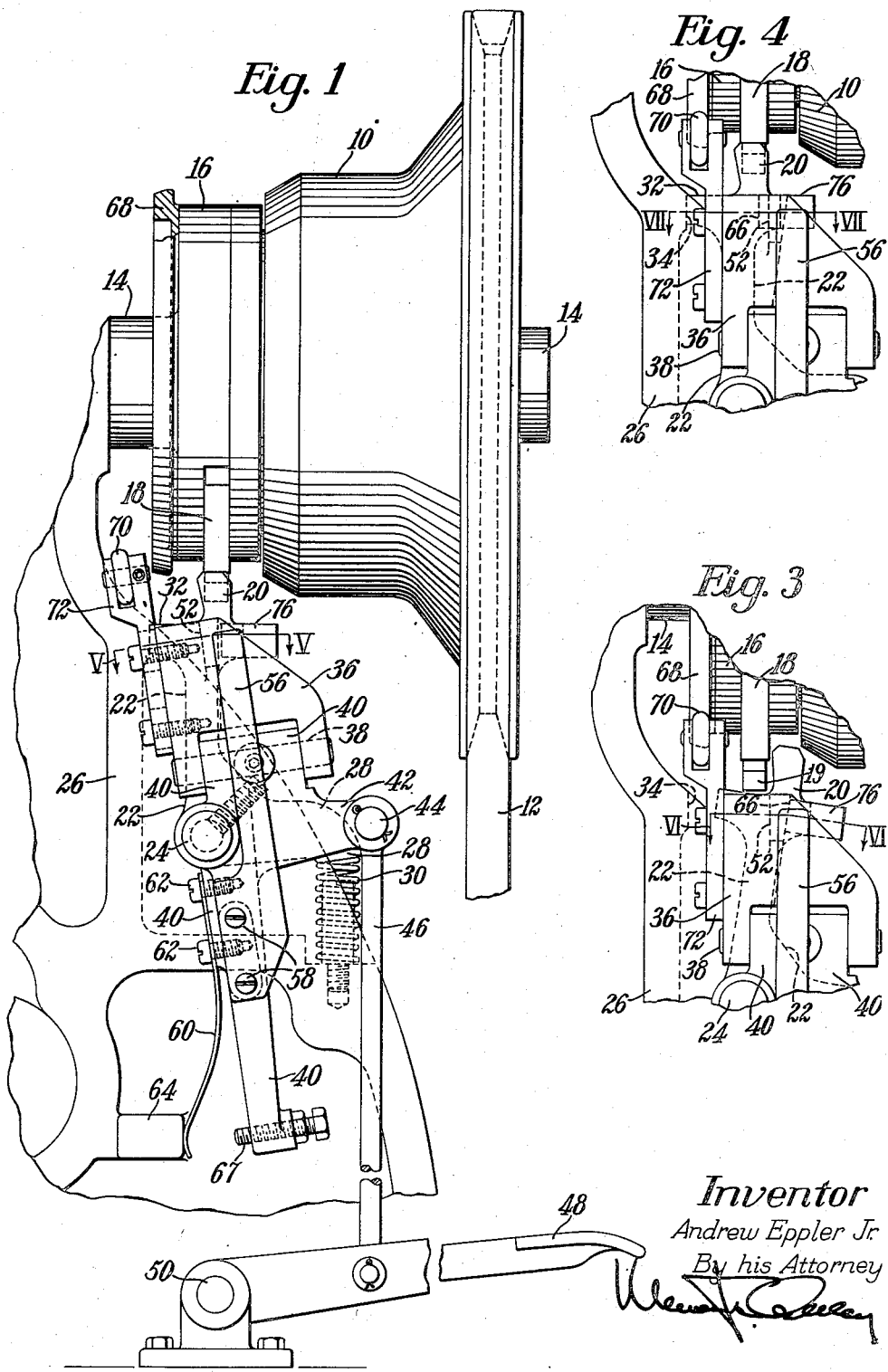
Fig. 1 is a side elevation of an illustrative clutch control mechanism in normal or clutch-disengaged position.
Figure 6:
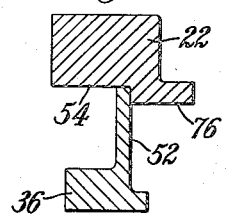
Fig. 6 is a sectional view on the line VI—VI of Fig. 3.
Figure 5:
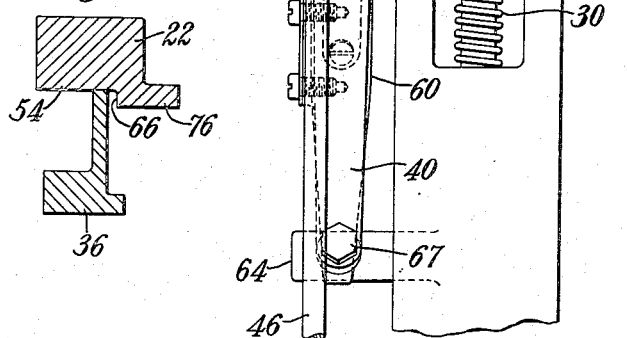
Fig. 5 is a sectional view on the line V—V of Fig. 1.
Figure 7:
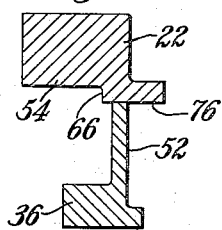
Fig. 7 is a sectional view on the line VII—VII of Fig. 4.

The lug 20 can be moved away from the disengaging arm 18 by a latch in the form of a block 36 pivotally mounted upon a pin 38 which is carried by a tripping lever 40 fulcrumed upon the pin 24. The pivot pin 38 extends in the direction transverse to that of the fulcrum pin 24 so that when the tripping lever 40 swings about its fulcrum pin 24 the latch 36 will move positively with it. Extending forwardly from the tripping lever 40 is an integral arm 42 which is pivotally connected by a pin 44 to the upper end of a rod 46. The lower end of the rod 46 is pivotally connected to a treadle 48 which is fulcrumed upon a pin 50 mounted in bearings on the base of the machine. Extending transversely from the latch 36 is a latching lug 52 having an end which is engageable with a surface 54 formed on the arm 22 as shown in Figs. 5, 6 and 7. A leaf spring 56 secured by screws 58 to the lever 40 bears against the latch 36 to urge said end of the lug 52 against the surface 54. The tripping lever 40 is yieldingly held in normal clutch disengaging position by a leaf spring 60 secured to the lever by screws 62 and having its lower end bearing against a lug 64 on the frame portion 26. When the treadle 48 is depressed the tripping lever 40 is rocked in a clockwise direction to bring the latch 36 from the position shown in Fig. 5 up against a shoulder 66 formed on the holding lever 22 normal to the path of movement of the holding lever about its fulcrum 24, and continued downward movement of the treadle will swing the lug 20 in a clockwise direction about the fulcrum pin 24 from the position shown in Fig. 1 to that shown in Fig. 3. The clutch will now automatically engage and the shaft 14 will begin to rotate. Excessive depression of the treadle is prevented by a stop screw 67 threaded through the lower end portion of the tripping lever 40 and engageable with the lower end portion of the leaf spring 60 which bears against the lug 64.

In order to prevent undesired repetition of the cycle if the operator should neglect to release the treadle, means are provided for releasing the lug 20 from the control of the treadle. To this end a cam 68 is rigidly secured upon the driven clutch member 16. The periphery of this cam 68 is engageable by a roll 70 freely rotatable in the upper end of a bracket 72 which is rigidly secured upon the latch 36. When the treadle is depressed to release the lug 20 from the disengaging arm 18, the roll 70 will swing into the path of the cam 68 and this cam has a rise 73 upon its periphery which, as the driven clutch member rotates, will engage the roll 70 and swing the latch 36 about its pivot pin 38 in opposition to the leaf spring 56. Such movement of the latch 36 will bring the lug 52 from the position shown in Fig. 6 into a position wherein it will be clear of the shoulder 66. The lug 20, thus freed from the latching lug 52, will snap back into its initial position, as shown in Fig. 4, under the influence of the spring 30 and after the high portion 73 of the cam 68 has passed the roll 70 the end of the lug 52 will come against a surface 76 formed on a flange extending from the arm 22. The lug 20, now being in clutch disengaging position, will engage the disengaging arm 18 as the driven member 16 comes to the end of its first revolution and disenagement of the clutch will take place. Release of the treadle 48 permits the spring 60 to return the tripping lever 40 and the latch 36 to their normal positions.

Having thus described my invention what I claim as new and desire to secure by Letters Patent of the United States is:

In combination with a self-engaging rotary clutch having a driving member, a driven member, and an arm associated with the driven member for disengaging the clutch, control mechanism comprising a holding lever having a shoulder normal to its path of movement, means for yieldably maintaining the holding lever in a stopped position of engagement with the disengaging arm to hold the clutch disengaged, a fulcrum pin for said holding lever having its axis extending in a direction transverse to that of the axis of the clutch, a latch engageable with the shoulder of the holding lever to withdraw the holding lever from the disengaging arm and thereby enable the clutch to engage, a tripping lever fulcrumed on said fulcrum pin, said latch being pivotally mounted on the tripping lever for swinging movement relative thereto about an axis extending in a direction normal to that of the fulcrum pin, means for yieldably holding the latch in a position relative to the tripping lever wherein the latch can engage said shoulder, means for yieldably holding the tripping lever in a normal position wherein the latch is out of operative engagement with the shoulder, thereby permitting the holding lever to maintain its said stopped position, treadle connections for swinging the tripping lever and with it the latch to move the latch against the shoulder and thereby withdraw the holding lever from the disengaging arm to permit engagement of the clutch, a cam on the driven clutch member, and means operated by the cam for swinging the latch about its pivotal mounting to clear said shoulder, thereby releasing the holding lever from treadle control and enabling it to resume its stopped position in the path of rotation of the disengaging arm, in which position it will engage the disengaging arm at the completion of a revolution and cause the clutch to disengage.

ANDREW EPPLER, Jr.

References Cited in the file of this patent

UNITED STATES PATENTS

| Number | Name | Date |
|---|---|---|
| 784,653 | Beyer | May 14, 1905 |
| 1,765,527 | Gollnick | June 24, 1930 |
| 2,518,492 | Reese | Aug. 15, 1950 |

FOREIGN PATENTS

| Number | Country | Date |
|---|---|---|
| 6,193 | Great Britain | Feb. 25, 1909 |
| 407,953 | Germany | Jan. 7, 1925 |